United States Patent [19]

Schacht et al.

[11] 4,021,342

[45] May 3, 1977

[54] LIQUID FILTER

[75] Inventors: Hans Schacht; Eberhard Bauer, both of Stuttgart; Walter Würth, Bietigheim; Karl Schleicher, Leinfelden; Wolfgang Soyer, Wiernsheim, all of Germany

[73] Assignee: Robert Bosch G.m.b.H., Stuttgart, Germany

[22] Filed: Sept. 23, 1975

[21] Appl. No.: 615,903

[30] Foreign Application Priority Data

Oct. 23, 1974 Germany .......................... 2450214

[52] U.S. Cl. ................................. 210/94; 210/232; 210/444; 220/67

[51] Int. Cl.² ........................................ B01D 55/14

[58] Field of Search .......... 264/265, 271, 249, 274, 264/259, 267, 269, 279, 294; 220/378, 67; 210/94, 232, 338, 444, 299; 222/394

[56] References Cited

UNITED STATES PATENTS

| 2,693,881 | 11/1954 | Chamber et al. | 220/67 X |
|---|---|---|---|
| 3,178,050 | 4/1965 | Doerpinghaus | 220/67 X |
| 3,424,343 | 1/1969 | Hoesselman | 220/67 |
| 3,550,832 | 12/1970 | Fitzgerald | 220/67 |
| 3,700,524 | 10/1972 | Sato | 220/67 |

Primary Examiner—Theodore A. Granger
Attorney, Agent, or Firm—Michael J. Striker

[57] ABSTRACT

A filter for liquid fuels wherein a flanged end portion of the metallic case for filter elements is embedded in or bonded to the reinforced open end of a transparent injection-molded plastic cup. The connection includes an elastic plastic liner which may constitute a barrier against any direct contact between the cup and the case or is disposed between the inner side of the end portion of the case and a raised annular portion of the open end of the cup. The liner compensates for differences between the thermal expansion coefficients of the materials of the case and cup and insures that the connection is not only leakproof but also resistant to relatively high fluid pressures in the filter. If the end portion of the case is bonded to the open end of the cup, it has an inwardly extending collar which overlies a bead of the open end; the liner then consists of hot melt and fills a gap between the inner side of the collar and the adjacent shoulder of the bead.

10 Claims, 6 Drawing Figures

U.S. Patent    May 3, 1977    4,021,342
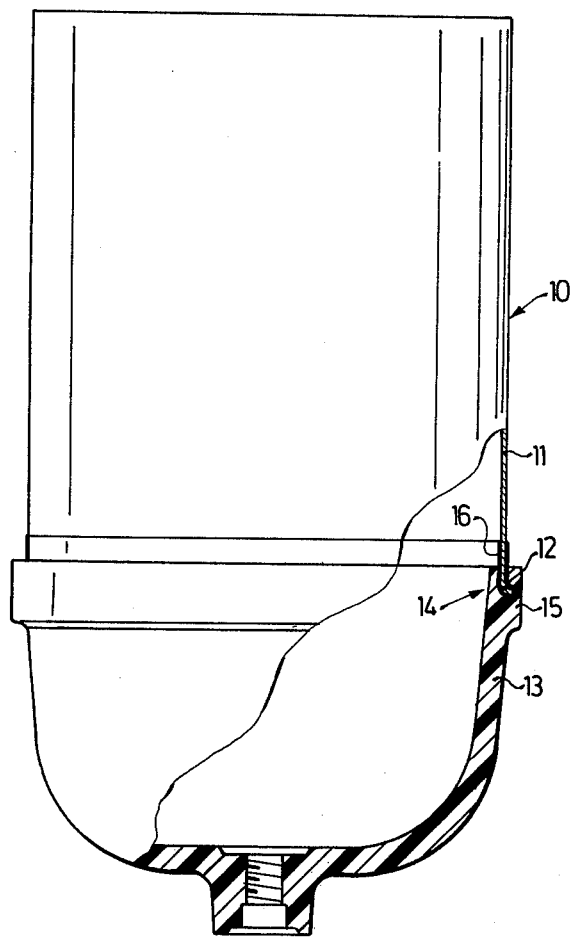
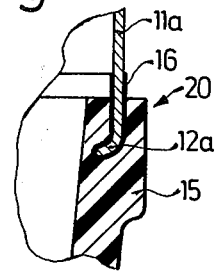
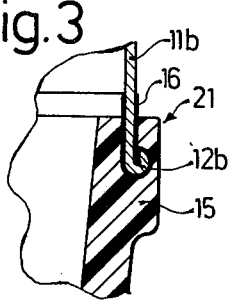
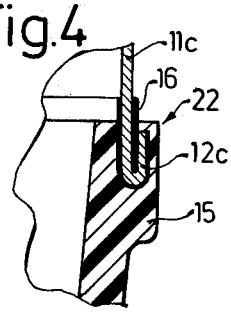
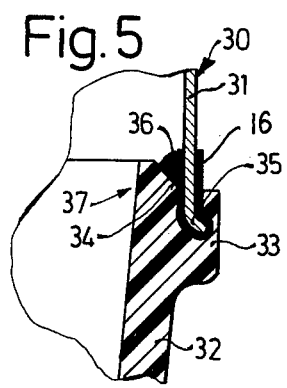
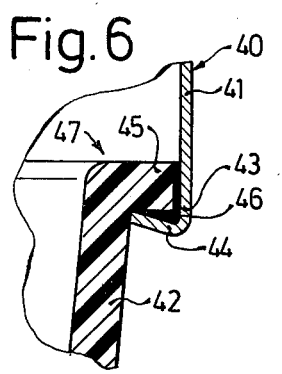

LIQUID FILTER

BACKGROUND OF THE INVENTION

The present invention relates to cleaners or filters in general, particularly to liquid filters. Still more particularly, the invention relates to improvements in liquid filters of the type wherein a metal housing or case for filter elements is sealingly connected with a chamber or cup which consists of nonmetallic material. Such filters or cleaners (also known as filterboxes) are often used for removing impurities from liquid fuels.

It is already known to connect a plastic cup with a metallic housing or case for filter elements by means of threads. Such types of connections between a metallic case and a nonmetallic cup are leakproof and exhibit a satisfactory resistance to pressures in spite of the fact that the thermal expansion coefficient of the metallic part is different from that of the nonmetallic part. However, a satisfactory sealing action can be achieved only if the threads on the metallic and nonmetallic parts are machined with a relatively high degree of precision which contributes significantly to initial cost of the filter. Moreover, the seal between the case and the cup is likely to deteriorate in response to repeated separation of the case which contains interchangeable filtering elements.

It was further proposed to utilize expendable cases for filtering material. Such cases can be connected with a glass cup by means of an elastic washer and an O-ring. The rather expensive glass cup can be reused, i.e., a case containing clogged filtering elements can be detached and replaced with a case containing fresh filtering elements. A drawback of the just described filter is that its cost is relatively high. Thus, it is normally necessary to use a fresh O-ring and a fresh washer whenever a case containing clogged filtering elements is to be replaced with a fresh case. Moreover, the replacement of a spent case with a new one takes up a relatively long interval of time and the person wishing to replace a spent case is likely to forget to keep a supply of spare washers and O-rings. Still further, an unskilled person is likely to connect a fresh case in such a way that the connection between the case and the glass cup allows leakage of liquid which can present a serious danger if the leaking liquid is a fuel.

SUMMARY OF THE INVENTION

An object of the invention is to provide a filter or cleaner, especially for liquid fuels or other hydraulic fluids, which is sufficiently simple and inexpensive to warrant its construction as an expendable commodity, which invariably establishes and maintains a leakproof seal between the metallic and nonmetallic components, and whose components can be assembled by resorting to readily available machinery.

Another object of the invention is to provide a filterbox which is constructed and assembled in such a way that it can be mass produced at a reasonable cost, which can be used as a superior substitute for conventional filterboxes, which can take any presently known types of filtering elements, and which (or at least one component of which) may constitute an expendable commodity.

A further object of the invention is to provide a novel and improved filterbox of the type wherein a metallic housing or case for filtering means is sealingly connected with a nometallic chamber or cup for separated impurities.

The invention is embodied in a filter, particularly for liquids (especially liquid fuels), which comprises a metallic housing or case having an annular portion which preferably constitutes an end portion of the housing, and an injection-molded plastic chamber or cup having an open end which forms with the end portion of the housing a pressure-resistant and leakproof connection. The thermal expansion coefficient of the material of the open end of the cup; therefore, the aforementioned connection further comprises an annular liner which is interposed between the end portion of the housing and the open end of the cup and is deformable (it preferably consists of eleastomeric synthetic thermoplastic material) to compensate for differences between the two thermal expansion coefficients when the temperature of the open end deviates from the temperature of the end portion. The liner may constitute a barrier against any direct contact between the housing and the cup; the thickness of such liner need not exceed one millimeter and is preferably a fraction of one millimeter.

In accordance with a presently preferred embodiment of the invention, the end portion of the housing is embedded in the material of the open end of the cup, preferably during injection molding of the cup, and at least the housing constitutes an expendable commodity.

The novel features which are considered as characterisitc of the invention are set forth in particular in the appended claims. The improved filter itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic partly elevational and partly central longitudinal sectional view of a filter wherein the metallic case is permanently connected with the cup in accordance with a first embodiment of the invention;

FIG. 2 is a fragmentary sectional view of a connection between the cup of FIG. 1 and a slightly modified case;

FIG. 3 is a fragmentary sectional view of a connection between the cup of FIG. 1 and a case which constitutes a further modification of the case shown in FIG. 1;

FIG. 4 is a fragmentary sectional view of a connection between the cup of FIG. 1 and a case which constitutes still another modification of the case shown in FIG. 1;

FIG. 5 is a fragmentary sectional view of a connection which constitutes a modification of connection shown in FIGS. 1 to 4; and FIG. 6 is a fragmentary sectional view of a further connection which constitutes a modification of the connection of FIG. 5 and of connections of the type shown in FIGS. 1 to 4.

DESCRIPTION OF THE PREFERRED EMBODIMENTS

FIG. 1 shows a filter or cleaner 10 (also called filterbox) for liquids, e.g., fuels. The filter comprises a substantially cylindrical metal case or housing 11 the lower end portion 12 of which is bent outwardly to form a relatively short radially extending flange. The exact nature of filtering elements (not shown) in the interior of the metal case 11 forms no part of the invention. The filter 10 further comprises a chamber or cup 13 which consists of a plastic material (preferably a synthetic thermoplastic substance) and is made by resorting to an injection molding technique, preferably in such a way that molding of the cup takes place simultaneously with establishment of a leakproof connection 14 between the reinforced (thicker) open end 15 of the cup and the adjacent flanged end portion 12 of the case 11. The material of the cup 13 is preferably transparent or translucent.

In accordance with a feature of the invention, the connection 14 between the open end 15 and the end portion 12 further comprises a relatively thin liner or film 16 which preferably consists of elastomeric synthetic thermoplastic material and coats both sides of the end portion 12. As shown, the film 16 can extend outwardly beyond that part of the end portion 12 which is actually embedded in the material of the reinforced end 15. In other words, the film 16 is configurated and applied in such a way that it constitutes a barrier against any direct contact between the metallic material of the case 11 and the nonmetallic material of the cup 13. This renders it possible to form the connection 14 during injection molding of the cup 13. As a rule, it will suffice to apply a film 16 whose thickness is in the range of one or more tenths of a millimeter. It is preferred to select for the film 16 a synthetic thermoplastic material which is not only elastic but also free of pores and capable of strongly adhering to the material of the case 11 as well as to the material of the cup 13. The elasticity is perhaps the most desirable characteristic of the film 16 because it insures that the connection 14 will not leak even it the thermal expansion coefficient of the material of the case 11 is much more or much less pronounced than that of the plastic material of the cup 13. It is further desirable to select for the film 16 a material which can stand relatively high pressures of liquid in the filter 10 and can resist the corrosive influence of such liquids.

The filter 10 of FIG. 1 can be manufactured as follows: The end portion 12 of a core 11 is inserted into the cavity of the mold in an injection molding machine. Prior to insertion, the end portion 12 is coated with an elastomeric synthetic thermoplastic material which forms the liner or film 16. The material of the cup 13 is thereupon injected into the cavity and is allowed to set. This completes the manufacture of the filter. Such technique is sufficiently simple to warrant the manufacture of filter 10 as an expendable commodity. The mounting of filter 10 in an automotive vehicle or elsewhere is simple and takes up a short interval of time because the connection 14 is established during manufacture. Thus, a person in charge of installing the filter between an inlet for liquid to be cleaned and an outlet for filtered liquid need not be concerned with the connection since the latter is invariably leakproof and ready for use as soon as the cup 13 is attached to the case 11. The liner or film 16 can be applied to the end portion by resorting to a dipping, spraying, melting or other well known technique.

FIG. 2 shows a connection 20 which constitutes a slight modification of the connection 14. The only difference is that the lower end portion 12a of the case 11a has an inwardly extending annular flange.

The connection 21 of FIG. 3 differs from the connection 14 or 20 in that the lower end portion 12b of the case 11b has an outturned flange of substantially circular crosssectional outline.

The connection 22 of FIG. 4 differs from the connection 14, 20 or 21 in that the lower end portion 12c of the case 11c has a relatively short cylindrical flange spacedly surrounding the adjacent portion of the case.

The manner in which a filter including the connection 20, 21 or 22 can be assembled is essentially the same as described with reference to FIG. 1.

FIG. 5 shows a portion of a second filter 30 having a metallic case 31 with a lower end portion 35 which resembles the end portion 12 of the case 11 shown in FIG. 1. The film-like liner 16 of FIGS. 1-4 is replaced with a relatively thick liner 36 of substantially semicircular cross-sectional outline. The cup 32 preferably consists of a light-transmitting synthetic thermoplastic material and is made by injection molding, preferably in a manner as described with reference to FIG. 1. The reinforced end of the cup 32 is shown at 33. This reinforced end has an annular inner portion 34 which extends axially outwardly (upwardly, as viewed in FIG. 5) beyond the annular outer portion so that it is surrounded by the liner 36 and defines with the adjacent part of the case 31 a ring-shaped seat for a portion of the liner. The reference character 37 denotes the permanent connection which includes the end portion 35, the open end 33 and the liner 36. The liner 36 preferably consists of elastomeric synthetic thermoplastic material and can be glued or otherwise secured to the inner side of the case 31 prior to insertion of end portion 35 into the cavity of the mold in an injection molding machine.

The main difference between the filter 30 of FIG. 5 and the filter 10 (or the versions of filter 10 shown in FIGS. 2-4) is that the liner 36 of the connection 37 does not provide a complete seal between the metallic material of the case 31 and the plastic material of the cup 32. Thus, at least the major part of the end portion 35 is embedded directly in the material of the cup 32.

If the connection between the case 31 and the cup 32 is to exhibit exceptionally satisfactory sealing characteristics, even when the temperature of the case differs considerably from the temperature of the cup or when the thermal expansion coefficient of the material of the case differs considerably from that of the material of the cup, the connection 37 may further include a second liner (not shown) which is identical with or analogous to the liner 16 of FIGS. 1 to 4.

FIG. 6 shows a connection 47 which is used in a filter 40 having a metallic case 41 and a plastic cup 42. The lower end portion 43 of the case 41 includes an inwardly extending collar 44 which preferably makes an acute angle with the main portion of the case and overlies a reinforced end or bead 45 of the cup 42. The relatively narrow and preferably wedgeshaped annular space between the underside of the bead 45 and the upper side of the collar 44 is filled with a mass 46 of hot melt which is activated in response to heating and thereupon sets to establish a highly satisfactory leakproof and pressure-resistant bond between the case and the cup. Once it has set, the mass 46 constitutes a liner which is a functional equivalent of the liner 16 or 36. The liner 47 is sufficiently elastic to insure the establishment of a satisfactory seal within the expected temperature range even if the thermal expansion coefficient of the material of the case is quite different from that of the material of the cup.

The improved filter is susceptible of many additional modifications without departing from the spirit of the invention. For example, even though a liner which consists of elastomeric synthetic thermoplastic material is preferred at this time, the liner can also consist of rubber or suitable lacquer. Also, the configuration of the end portion of the case and/or the open end of the cup can be changed practically at will, the same as the extent to which the end portion of the case extends into the material of the cup and the size and shape of the case and/or cup.

The case 11, 31 or 41 may consist of sheet-steel or aluminum; the cup 13, 32 or 42 may consist of transparent plastic on polyamid base; and the liner 16, 36 or 46 may consist of thermoplastics especially hot-melt like copolyamides, copolyesters, polyurethans, phenoxy-resin or of a suitable rubber.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In a filter, the combination comprising a filter element, a metal housing means with an inlet and outlet for respective fluid communication with opposite sides of the filter element, said housing means being provided with an open bottom defined by an annular end portion comprising a bent flange, closure means for said end portion consisting of a plastic cup with its peripheral open end portion injection-molded about said bent flange of said annular end portion of said housing means to thereby provide a pressure-resistent and leakproof connection between said housing means and said cup, said open end portion of said cup and said flange of said annular end portion of said housing means having different thermal expansion coefficients; and an annular liner of elastic material interposed between said annular end portion and said bent flange of said housing means and said open end portion of said cup and constituting a barrier against any direct contact between said housing means and said cup, said annular liner being deformable to compensate for the difference in the thermal expansion coefficients when the temperature of said open end portion of said cup deviates from the temperature of said annular end portion and said flange of said housing means.

2. A combination as defined in claim 1, wherein said liner consists of synthetic plastic material.

3. A combination as defined in claim 1, wherein said liner consists of synthetic thermoplastic material.

4. A combination as defined in claim 1, wherein said liner is a film having a thickness of less than 1 millimeter and constituting a barrier against any contact between said housing and said cup.

5. A combination as defined in claim 1, wherein said liner is a hot melt.

6. A combination as defined in claim 1, wherein said cup consists at least in part of light-transmitting plastic material.

7. A combination as defined in claim 1, wherein the material of said liner is resistant to liquid fuels.

8. A combination as defined in claim 1, wherein at least said housing is expendable.

9. A combination as defined in claim 1, wherein said annular end portion of said housing has an inner side and an outer side; and further comprises an additional liner adjacent to one side of said annular end portion.

10. A combination as defined in claim 9, wherein said open end of said cup has a raised annular portion and said liner is disposed between said raised annular portion and said one side of said annular end portion.

* * * * *